United States Patent [19]

Clack et al.

[11] Patent Number: 5,002,664

[45] Date of Patent: Mar. 26, 1991

[54] FLUID FLOW CONTROL DEVICE FOR R.O. FILTRATION PURIFICATION SYSTEMS

[75] Inventors: Robert A. Clack, Madison; Richard E. Clack, Windsor; Melvin R. Hemp, Lodi, all of Wis.

[73] Assignee: Clack Corporation, Windsor, Wis.

[21] Appl. No.: 494,155

[22] Filed: Mar. 15, 1990

[51] Int. Cl.$^5$ ............................................... B01D 61/08
[52] U.S. Cl. .................................... 210/251; 210/432
[58] Field of Search .................... 210/652, 195.2, 251, 210/257.2, 321.6, 321.65, 321.72, 418–424, 428–432

[56] References Cited

U.S. PATENT DOCUMENTS

4,599,171 7/1986 Padilla et al. .................... 210/257.2

Primary Examiner—Frank Sever
Attorney, Agent, or Firm—Lockwood, Alex, FitzGibbon & Cummings

[57] ABSTRACT

Provided in a reverse osmosis system (R.O.) is a fluid flow control device including an elongate unitary thermoplastic body having a generally rectangular configuration defined between spaced and opposed upper and lower major surfaces, a plurality of filter module-receiving socket formations extending normally from said lower surface at spaced apart locations along the length thereof, each socket formation including coaxially aligned radially inner and radially outer spaced apart tubular projections, and inner recess defined within said inner tubular projection and an outer annular recess defined between said inner and outer tubular projections, and aperture defined in said lower surface disposed with each said inner and outer recess; a plurality of discrete fluid flow passages defined in said body connecting certain ones of said socket apertures, female input/output connector means disposed at one end of said body, said female connector including a plurality of channel means for connecting selected ones of said passages to said system tap water source, said introducing means and said conveying means, respectively, said female connector means being adapted to polarizedly matingly sealingly and lockingly engage a complimentary male I/O connector; and a like plurality of filter modules matingly and sealingly engaged in said socket formations.

1 Claim, 6 Drawing Sheets

FLUID FLOW CONTROL DEVICE FOR R.O. FILTRATION PURIFICATION SYSTEMS

BACKGROUND OF THE INVENTION

The present invention generally relates to reverse osmosis filtration purification systems including a plurality of filter cartridges connected together in series for selectively and sequentially removing specific kinds of impurities from a tap water supply. More particularly, it relates to a fluid flow control apparatus which mountingly receives each of the filter cartridges to be used and directs fluid flow internally between the filters within the filter section and connects the filter section to other elements of the overall R.O. purification system.

Reverse osmosis filtration purification systems are increasingly being employed to purify municipal and well water supplies to provide improved drinking water for the home, for use in ice makers, vending machines, humidifiers, for watering indoor plants and the like. Many applications require that more than one filter be employed in series to selectively remove different impurities. Frequently, a series of filters is needed due to the fact that some R.O. membrane filters and other speciality filters are sensitive to or do not work well if the incoming water contains for example, chlorine. In these situations chlorine is first removed from the feed water in a pre-filter before it is fed into the chlorine-sensitive filter positioned downstream.

Various filter cartridges have been developed for use in these systems. Examples include sediment filters, granular activated carbon (GAC) filters, reverse osmosis membrane filters including thin film, cellulose, cellulose acetate, cellulose triacetate and hollow-fiber types, specialty filters for removing lead, iron, nitrates, as well as, microfilters and ultrafilters. Filter cartridges containing both mechanical and chemical removal media generally have a standardized cylindrical configuration including entry and outlet structures for attaching the filters to other system elements.

The filter cartridges are placed in standardized pressure vessels and incoming feed water passes into the vessel and through the filter under pressure. Flow through the filter module including the filter cartridge and pressure vessel may vary depending on the type of filter cartridge employed. Some filters work by directing incoming fluid along the periphery of the filter and vessel. Water is forced through the removal media to enter a centrally disposed tube or passage defined in the filter. Product water within the central tube may flow concurrently or counter currently with respect to the feed water flow entering the vessel. R.O. filters typically have three ports to the module including an impure water inlet, a product water outlet and a concentrate or waste water outlet.

Different combinations of these filters in series will require different specific fluid flow connections between the filters, due to variations in flow requirements for each filter in the series. Conventionally, the various flow connections within the filter section from one filter to another and between the filter section and the remainder of the R.O. system are made using polytubing provided with coupling adaptors. A major disadvantage associated with these polytube linked networks is leakage. The systems operate under pressure and each and every coupling provides a potential site for leakage.

Another disadvantage of these systems is that changeover of filters within the system is burdensome. Some tubing connections must be detached before a pressure vessel can be removed from the filter series and the filter cartridge replaced. Every time the tubing sections are disconnected and reconnected, the risk of leakage in the system increases. Moreover, some systems present such a complicated network of criss-crossing tubes, that a skilled technician is needed to make repair calls.

In order to overcome the disadvantages of the prior art systems, it is an object of the present invention to provide a filter section fluid flow control apparatus which significantly reduces or eliminates the need for polytubing connections between filter modules.

It is another object of the invention to provide a self-contained filter section having a simple connectorized input/output connection to other system elements.

It is a further object of this invention to provide a substantially tubeless fluid flow control device for a filter section including quick disconnect features for the filter modules to facilitate changeover and repair.

It is still another object of the present invention to provide a new and improved filter section for use in R.O. systems having a pop-in pop-out feature enabling the entire filter section to be disconnected and removed as a unit from the remainder of the system for repair or substitution by a new filter section unit which may contain the same or different filter cartridges.

SUMMARY OF THE INVENTION

In accordance with these and other objects, the present invention provides a new and improved fluid flow control device for use in an R.O. filtration purification apparatus. The fluid flow control device serves as a substrate for treating the entire filter section as a module or unit. The fluid flow control device includes socketing features for receiving and mounting standard filter modules and provides a single connectorized input output connection to the system.

More particularly, in accordance with the invention, the new and improved fluid flow control device comprises a unitary thermoplastic body portion having a generally rectangular configuration including spaced apart, opposed upper and lower major surfaces. A female input/output (I/O) receptacle connector is defined at one end of the body portion for connecting the fluid flow control device to a matable mole I/O connector which is attached to an impure water inlet, an R.O. purified water outlet and a waste water outlet associated with the overall system. A plurality of socket formations project outwardly at spaced apart locations of the lower major surface of the body. Each socket formation includes inner and outer tubular projections which define inner and outer recesses. Each recess is provided with a fluid flow aperture defined in the lower major surface of the body portion. External threads are provided on the outer surfaces of the outer tubular projection in each socket formation to provide for sealed threaded engagement of a pressure vessel and filter cartridge to the fluid flow control device.

The fluid flow control device further includes a plurality of fluid flow control passages defined therein for connecting various ones of the socket apertures to specific other socket apertures for directing water flow to and from each filter element, as well as fluid flow control channels for connecting the flow control passages to the female I/O connector.

The new and improved fluid flow control device of the present invention may be prepared by hot plate fusion bonding of a pair of individually molded housing halves. The resulting fusion bonded body is a unitary one piece body capable of withstanding elevated pressures of up to above about 1100 psi. The fluid flow control passages and channels are defined in the mating faces of each housing half and are bounded by moat regions which provide enhanced fusion bonding of the channel and passage forming regions and ensures that crossover contamination does not occur.

The channels and passage are specifically designed to include various dams or flow gates for defining a particular flow path through the device which may easily be added or are moved from the molds for making the housing halves. This provides a distinct manufacturing advantage in that by selective removal of mold inserts, the flow pattern through the device may be programmed for any combination of filters used with the device arranged in any order. As a result a large number of different flow control bodies can be made from the same mold which dramatically reduces manufacturing costs by eliminating the need for individual molds and provides improved flexibility in terms of production and inventory control.

In a preferred embodiment, the fluid flow control device also includes an integral automatic shut off valve formation adapted to receive valve inserts or not as the particular filter section requires.

In accordance with the invention, the new and improved modular filter section units may be detached from the system and a new unit put in its place by an unskilled service person. The removed filter sections may be returned to a central location for replacement or reconditioning of the filter cartridges within the unit.

Other objects and advantages of the invention will become apparent from the following Detailed Description of the Invention taken in conjunction with the Drawings, in which:

DETAILED DESCRIPTION OF THE PREFERRED EMBODIMENT

Figure 1:
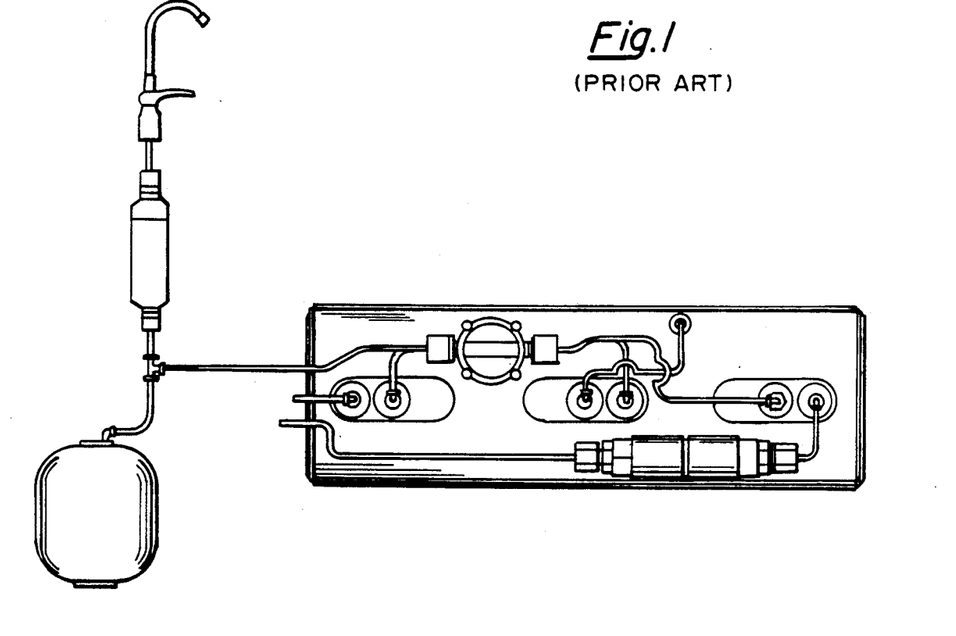
FIG. 1 is a schematic view of a conventional prior art reverse osmosis filtration purification system including an R.O. purified water dispensing faucet, a pressure resistant storage tank and showing a top plan view of a filter section assembly board with tubing connections shown between filter section elements.
Figure 2:
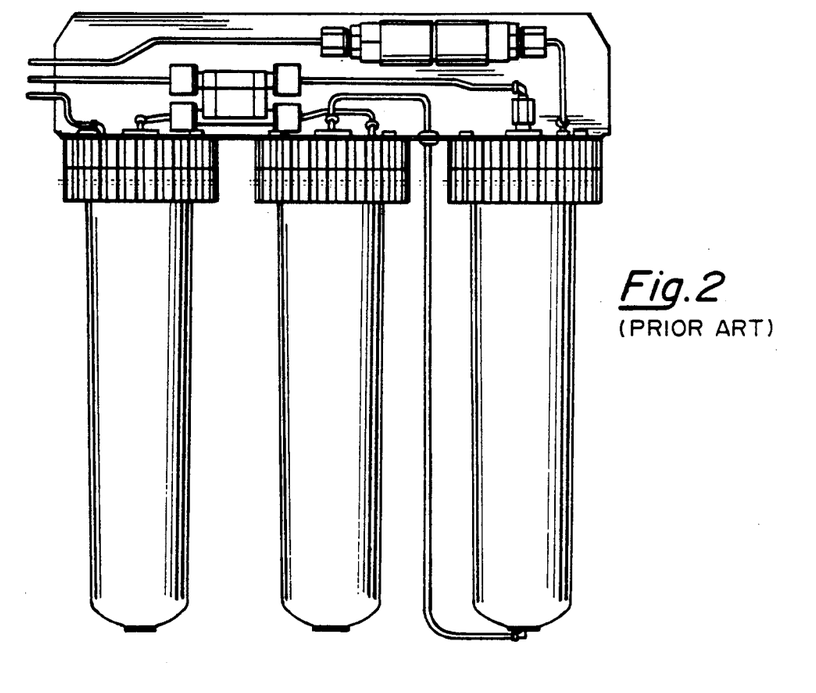
FIG. 2 is a front elevation view of the filter section of the prior art reverse osmosis water purification system shown in FIG. 1.

Referring now to FIGS. 1-2, a conventional prior art system of a filtration purification reverse osmosis type is shown. As shown in FIG. 1, an R.O. system includes a dispensing faucet for dispensing purified R.O. water from a storage tank which is provided to temporarily store water made from the reverse osmosis filter section until withdrawn from the faucet as desired. As shown in FIGS. 1 and 2, the filter section of the reverse osmosis filtration purification system includes a generally L-shaped mounting flange to which components and elements of the filter section are mounted. Referring now to FIG. 2, a series of three different filter modules including a sediment pre-filter and intermediate granular activated carbon filter and a right hand reverse osmosis membrane filter are shown extending downwardly from the mounting flange. A plurality of tube connections are provided above the filter modules on the mounting flange to connect the various filters together in series and to connect output from various filter elements to other system elements. As shown in FIG. 2, the conventional system includes a drain restrictor which is connected to the waste water outlet from a reverse osmosis filter which continues on to drain. An automatic shutoff valve assembly is shown connected to the pure water outlet of the reverse osmosis filter and with a continuing connection to the storage tank shown at the left hand portion of the drawings. The automatic shutoff valve is also connected at its lower portion in between the sediment filter output and the granulated activated carbon filter input.

With respect to the conventional filter section depicted in FIG. 2, incoming tap water at line pressure enters the filter section at the left hand portion as shown in FIG. 2 to enter the sediment filter. Pre-filtered water exits the sediment filter module through a central tube and enters the lower left hand portion of the automatic shutoff valve. If the shutoff valve is in an open condition the pre-filtered water exits at the right hand side at the automatic shutoff valve and is directed to the input of the granulated activated carbon filter. The pre-filtered water is directed downwardly along the sides of the pressure vessel containing the granular activated carbon filter and then migrates radially inwardly to a central filter product tube. The sediment pre-filtered and GAC pre-filtered water exits from a central location above the granulated activated carbon filter and is directed by a tubing connection to the base of the reverse osmosis pressure vessel. The water enters the bottom of the vessel and fills the pressure vessel. An upper right hand outlet directs waste water to drain. Pressurized water to be purified migrates radially inwardly through the reverse osmosis filter into a central pure water return tube which exits upwardly from a central portion of the reverse osmosis filter module to enter the automatic shutoff valve at the upper right hand connection as shown. Thereafter, it is directed into the storage tank for temporary storage prior to consumption.

As is clearly shown in FIGS. 1 and 2 the conventional filter section of a multi-filter reverse osmosis system includes a large number of polytubing connections between various elements within the system and filter section. Each of these connection points provides a potential site for system leakage which is clearly undesirable. Moreover, each of the specific tubing connections are of a given length and changes in the types and patterns of flow for the filters positioned within the filter module arrangement generally cannot be made without preparing a brand new mounting bracket with new dedicated polytubing connections between the differing filter elements.

Figure 3:
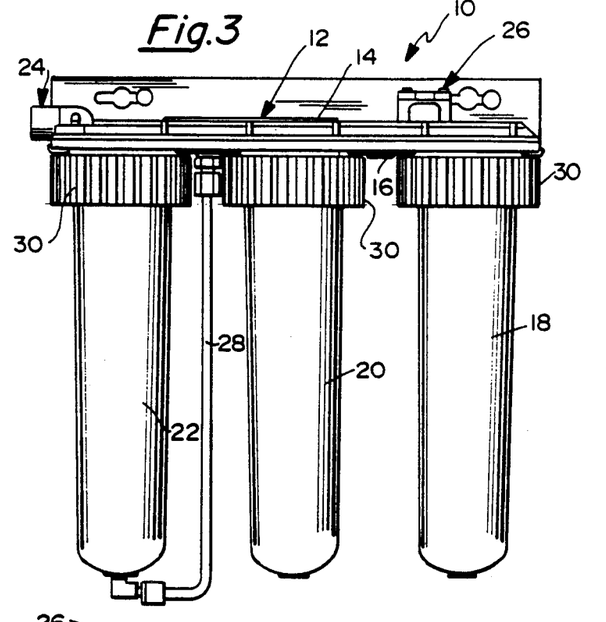
FIG. 3 is a front elevation view of the new and improved filter section of the present invention illustrating the new and improved fluid flow control device with three filter modules attached thereto.
Figure 4:
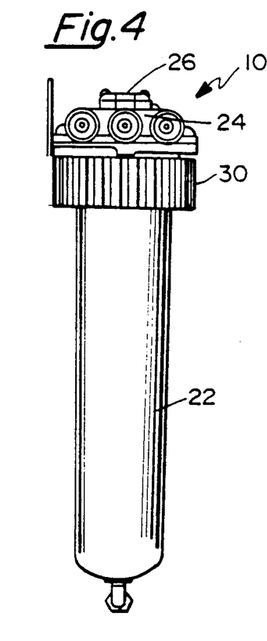
FIG. 4 is a left hand end elevation view of the new and improved filter section in accordance with the present invention taken along lines 4—4 in FIG. 3.

Referring now to FIG. 3 a new and improved filter section of a reverse osmosis system incorporating the new and improved fluid flow control device of the present invention is shown. To better illustrate the advantages provided by the present invention the same filter arrangement will be described to better compare the filter section provided by this invention to the prior art arrangement shown in FIGS. 1 and 2.

More particularly, the new and improved filter section of the present invention includes a fluid flow control device generally referred to by reference number 10. Fluid flow control device 10 includes an elongate generally rectangular thermoplastic body 12 having upper and lower spaced and opposed major surfaces 14, 16. Three filter modules 18, 20, 22 are shown depending from the lower surface 16 thereof including, from left to right, a sediment pre-filter 18, an intermediate activated carbon filter, module 20 and a left hand reverse osmosis filter module 22. At the upper left hand portion the new and improved fluid flow control device of this invention is shown to include a female input output connector 24 for connecting the overall filter section 10 as a modular unit to the remainder of the reverse osmosis system. In the upper right hand portion, projecting upwardly from the upper surface 14 is shown an automatic shutoff valve housing 26 which may be integrally molded with the upper housing half of the fluid flow control device.

As will be immediately apparent, the only tubing connections shown in the filter section 10 is the impure water input tubing line 28 extending from the fluid flow control device 10 intermediate the activated carbon filter 20 into the bottom entry port of the reverse osmosis filter module 22 and male connector tubing connections to the input/output female connector 24 shown at the upper left hand portion.

Each of the filter modules 18, 20, 22 are of a conventional design. They include an upper outwardly extending peripheral flange that is adapted to engage a shoulder provided in the threaded coupling nut 30 for attachment of the filter modules to the socket formation provided on the lower surface 16 of the fluid flow control device 10. The coupling nuts 30 particularly for the reverse osmosis membrane filter module, provide an advantage in that the pressure housing doesn't have to be rotated in order to disengage the filter module from the fluid flow control device manifold 10. Instead, the coupling nut 30 only needs to be rotated to disengage that filter module from the lower surface and device.

Figures 5, 6, 7:
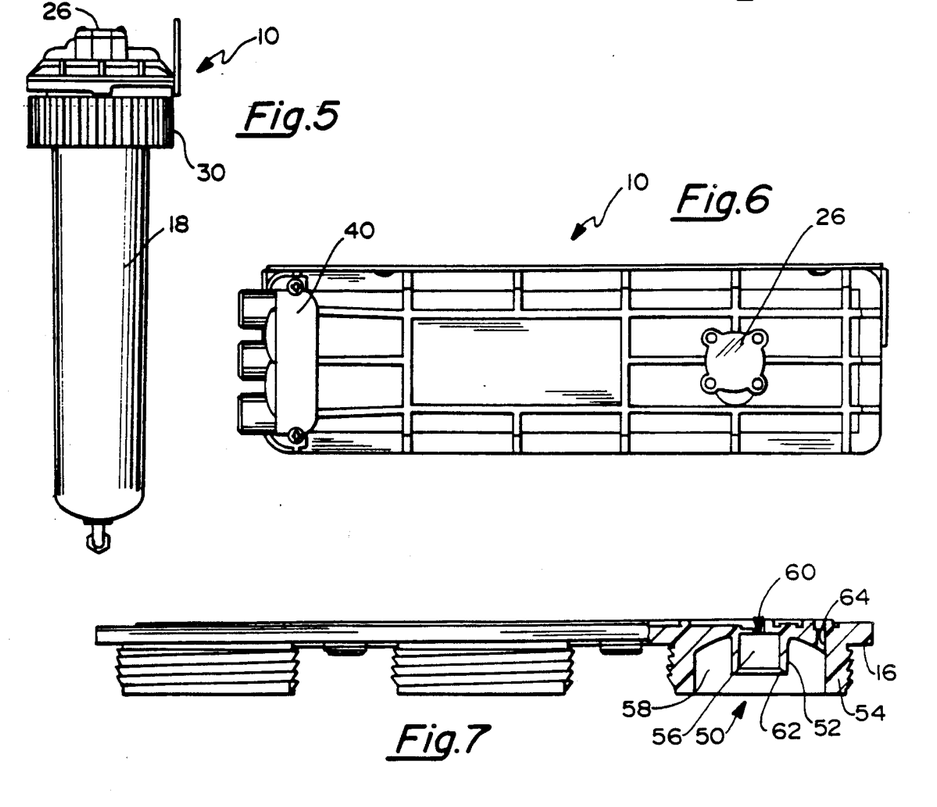
FIG. 5 is a right hand end elevation view of the new and improved filter section taken along view lines 5—5 in FIG. 3.
FIG. 6 is a top plan view of the new and improved fluid flow control device of the present invention.
FIG. 7 is a front elevation view partly in section of the bottom housing half of the new and improved fluid flow control device of the invention.

Referring now to FIG. 6, a top plan view of the fluid flow control device 10 is shown. At the right hand portion of the drawings the upper portion of the automatic shutoff valve is shown with its cap lid sealingly secured to the integral valve housing by means of phillips head screws. Referring to the right hand portion of FIG. 6, a locking bracket 40 is shown secured around the female input output connector also by means of phillips head screws. The bracket member includes internal pins which descend vertically through the shroud wall of the female input/output connector in order to engage positioning means projecting forwardly from the mating face of a complimentary male connector. The pins cooperate with the positioning means on the male connector to facilitate that the male connector is fully inserted into the female connector to ensure that sealing engagement between the mated input/output connectors.

The new and improved fluid flow control device 10 of the present invention comprises a unitary thermoplastic body that is formed by hot plate fusion bonding of two individually molded housing halves.

Referring now to FIG. 7, a front elevation view of the bottom housing half of the fluid flow control device 10 is shown. At the right hand portion of the Figure, the details of a socket formation 50 are clearly shown. More particularly, the lower surface 16 of the fluid flow control device 10 includes three socket formations 50 projecting normally downwardly therefrom. Each socket formation 0 is defined by a pair of coaxially aligned radially spaced inner and outer tubular projections 52, 54. The inner tubular projection defines an inner cylindrical recess 56 and an outer annular recess 58 is defined between the inner and outer tubular projection members. The inner recess 56 includes a centrally located aperture 60 defined through the lower surfacent 16. The opposed free end of the tubular projection includes a tapered entrance portion 62 for directing the central return line of a filter module or filter cartridge into mated and sealed engagement with the socket formation 50. The outer annular recess 58 also includes an aperture 64 defined in the lower major surface 16 for either directing incoming fluids to or receiving outgoing fluids from the circumferential portion of the pressure vessel or filter module assembly 30.

Figure 8:
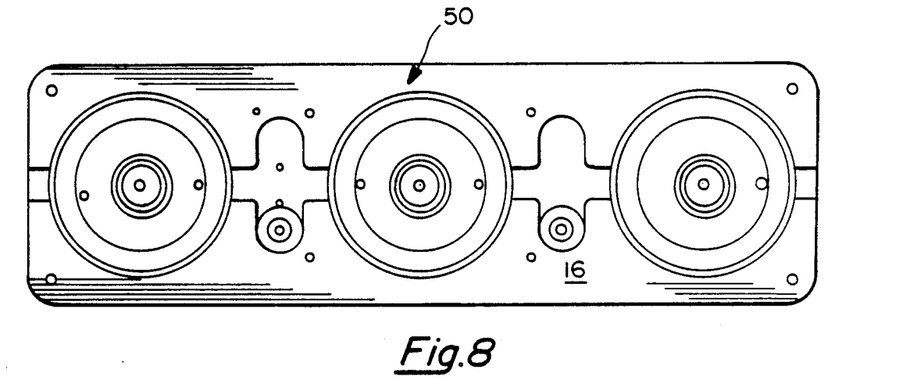
FIG. 8 is a bottom plan view of the bottom housing half of the new and improved fluid flow control device of this invention.

Referring now to FIG. 8, a bottom plan view of the lower housing half is shown. The three spaced apart socket formations 50 are separated by intermediate regions which define a hose coupling location for attachment of the polytubing, for example, tubing extending between the base of the reverse osmosis filter module to fluid circuitry defined within the fluid flow control device to be more particularly defined hereinafter. As shown in FIG. 8, each of the socket formations 50 includes a number of aperture sites which indicates the modular nature of each of the molded housing halves.

Figure 9:
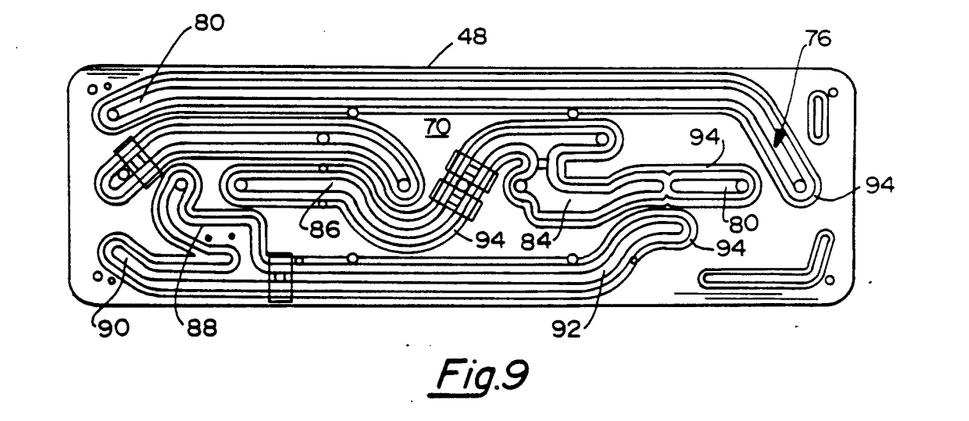
FIG. 9 is a top plan view of the bottom housing half of the new and improved fluid flow control device of the present invention.

Referring to FIG. 9, the upper or mating face 70 of the lower housing half 48 adapted to be heat fusion bonded to a mating surface 72 of an upper housing half 74 is depicted. As shown in FIG. 9, the upper mating surface 70 of the lower housing half 48 is provided with plurality of discrete fluid passages 76 for directing fluids along the filter section of the control device including: an impure tap water inlet channel or passageway 80, a sediment filtered outlet passage 82 into an automatic shutoff valve and continuing on the opposed side of said valve to a GAC filter inlet 84. The carbon filtered output of the GAC filter travels along the passage 86 as shown. The output is directed to the bottom of the TFC upflow R.O. module 22. Purified upflow from the R.O. module is directed into passageway 88 including a left hand connection to the channel 90 of the female input-/output connector 24 to direct purified R.O. water to the storage tank. At the right hand portion, this passage 88 provides an input line 92 into the automatic shutoff valve for shutting off the flow of incoming water into the system when the pressure of the pure water in the storage container indicates that a maximum storage capacity the tank has been reached.

Figure 10:
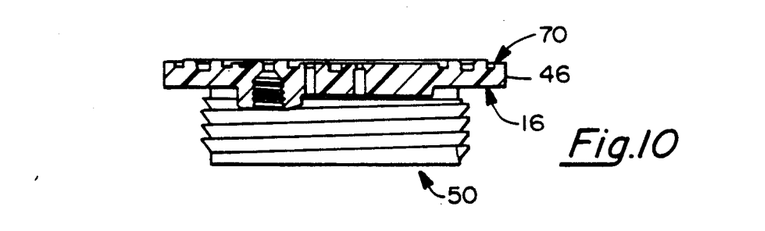
FIG. 10 is an elevated cross sectional view of the bottom housing half taken along view lines 10—10 in FIG. 8.

Referring now to FIGS. 9 and 10 each of the passageways in channels defined in the mating face of the lower housing half are upstanding from the mating face surface. Disposed immediately adjacent each of the upstanding wall portions which will be fused to form the passages and channels are cutouts or moat areas 94. These are provided to assist in the hot plate fusion bonding process to accept flash or excess plastic runoff during the fusion bonding process. These moat areas are also provided to cooperate with complimentary moats the mating face of the upper housing half to define air gaps between channels to prevent any crossover contamination in the event of a leak developing in one of the passages. As shown in FIG. 10, each of the channel forming walls provided in the mating face of the lower housing half is provided with inwardly tapered entrances to each channel to ensure that the final hot plate fuse channels will have appropriate dimensions after fusing.

Figure 11:
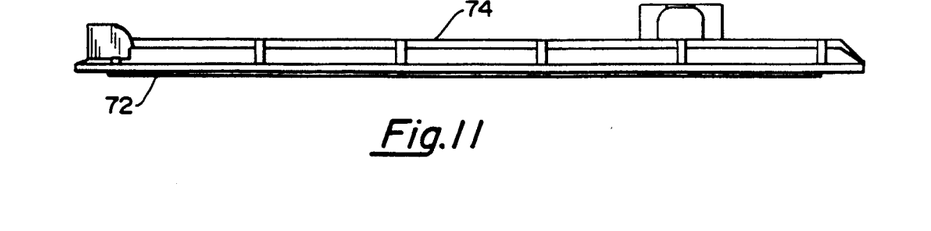
FIG. 11 is a front elevation view of the top housing half of the new and improved fluid flow control device of the present invention.

Referring now to FIG. 11, a front elevational view of the upper housing half of the new and improved fluid flow control device of this invention is shown. On the left hand portion, the female input output connector housing is depicted and the wall formations for forming the passages located on the mating face are shown to project downwardly from the mating face thereof.

Figure 12:
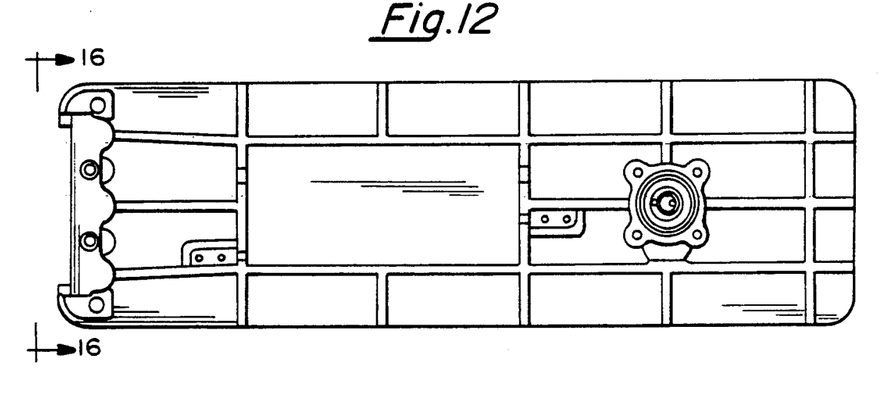
FIG. 12 is a top plan view of the upper housing half of the fluid flow control device.

Referring now to FIG. 12, at the right hand portion of the figure, the female input output connector housing is shown to include bracket mounting screw receiving flange members as well as positioning pin receiving apertures which are adapted to receive positioning pins of a mounting bracket to keep the male and female input output connectors in their fully mated and sealed condition.

Figure 13:
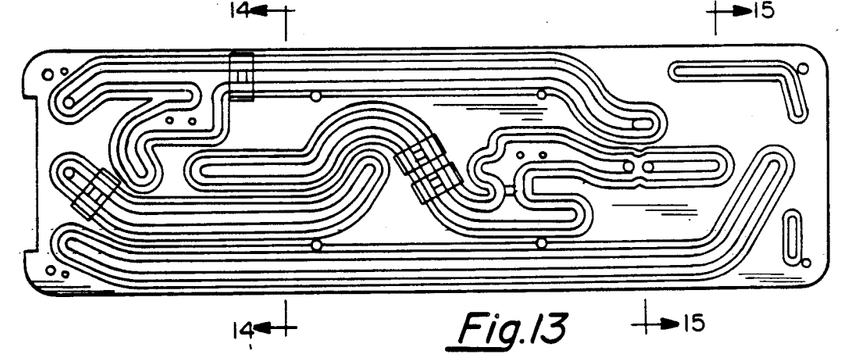
FIG. 13 is a bottom plan view of the upper housing half of the fluid flow control device.
Figure 14:
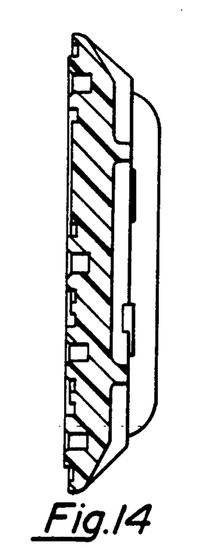
FIG. 14 is an elevated cross sectional view of the upper housing half taken along view lines 14—14 in FIG. 13.

Referring now to FIG. 13 the mating face of the upper housing half is shown. It also includes a number of upstanding wall portions which define fluid flow path ways. The wall members are complimentary to the upstanding wall members provided in the mating face of the lower housing half and when the mating faces of the upper and lower housing halves are heat plate fusion bonded together, the edges of the wall elements in each of the respecting mating faces will be fused to form substantially cylindrical passageways for directing the flow of various fluids throughout the filter section and into and out of the device. The passageway wall forming sections are also shown to include the moat areas to provide an improved final product. The moat areas and the channel forming grooves are shown more particularly in FIGS. 14 and 15.

Figure 15:
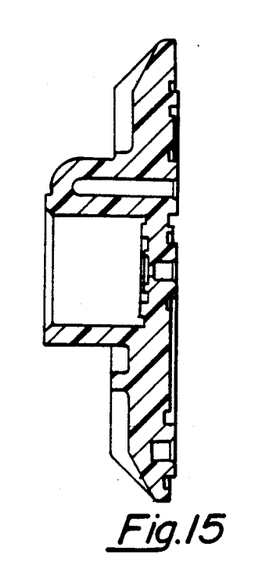
FIG. 15 is an elevated cross sectional view of the upper housing half taken along view lines 15—15 in FIG. 13.

Referring now to FIG. 15, the upper housing half is preferably molded to include a automatic shutoff valve housing as shown. The upper half of the body member of the fluid flow control device may be molded to include a generally tubular valve housing formation including an incoming valve opening, a cup shape formation defining a valve seat and an outflow passageway. Further details of the valve formation will be apparent from FIGS. 19 and 20. In the preferred embodiment, the valve housing is incorporated into the upper body half mold and it is adapted to receive valving inserts as desired to either provide an automatic shutoff valve function or to omit the valving elements which would omit the automatic shutoff.

Figure 16:
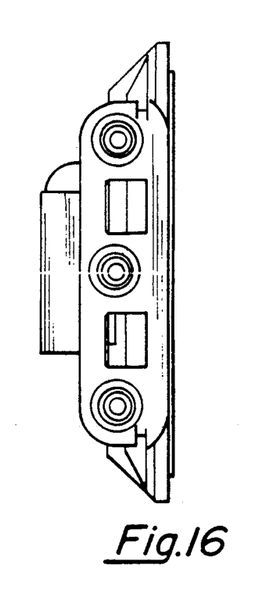
FIG. 16 is a left hand end elevation view of the upper housing half.
Figure 17:
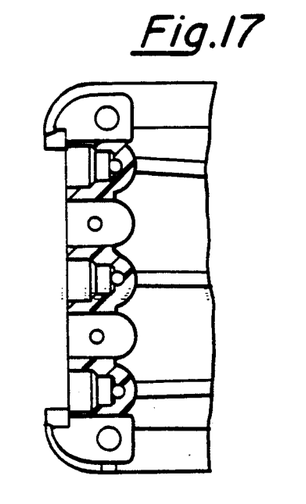
FIG. 17 is an elevated sectional view of the female I/O connector in the upper housing half taken along view lines 17—17 in FIG. 12.
Figure 18:
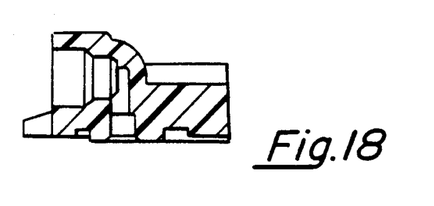
FIG. 18 is a cross sectional view of the female input-/output connector on the upper housing half taken along view lines 18—18 in FIG. 12.

Referring now to FIGS. 16, 17, 18 and FIGS. 21 through 27 the new and improved fluid flow control device of the present invention is provided with an input output connector at one end thereof including a male connector half connected to system leads, a female connector half integrally molded into the upper body half of the fluid flow control device and a locking bracket member. As shown in FIG. 16 the mating face of the female connector half includes three spaced apart circular openings and a pair of intermediate rectangular openings. As shown in FIGS. 17 and 18, the generally circular openings extend rearwardly from the mating face to define a stepped socket for receiving fluid conveying projections extending from the complimentary face of the male plug connector. The stepped configuration of each socket includes a tapered transition portion which provides a bearing surface which cooperates with a similarly angled bearing surface on the male plug to compress an O-ring seal therebetween to sealingly connect each fluid circuit defined in the male plug into the receptacle sockets defined in the female connector. As shown in FIG. 17, each of the female receptacle sockets includes a channel connection connecting the fluid circuits in the male plug member to the various passageways (3) within the fluid control device.

Figure 25:
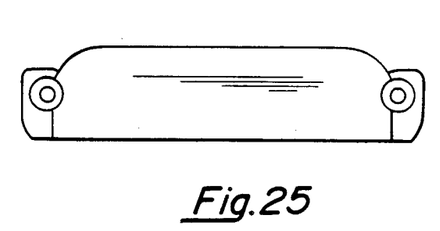
FIG. 25 is a top plan view of the locking bracket for use with the I/O connector of the invention.
Figure 26:
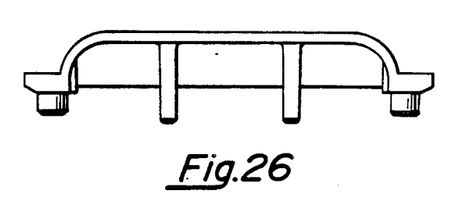
FIG. 26 is a front elevation view of the locking bracket.
Figure 27:
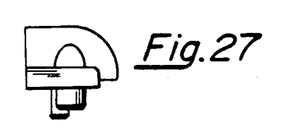
FIG. 27 is a side elevation view of the locking bracket.

Each of the rectangular openings also extend rearwardly from the mating face of the female connector to provide mating alignment guides for guiding the male plug member into mated engagement within the female connector. Also as shown in FIGS. 16 and 18, the female connector includes a pair of pin receiving vertical passageways which intersect the alignment guide openings or guideways. Pin members extending from a locking bracket shown more particularly in FIGS. 25 through 27 are positioned through these pin receiving passageways and through complimentary pin receiving holes defined in the projecting male mating guide members to force the front end portions projecting from the mating face of the male connector into locked and sealing engagement within the female connector. Also as shown in FIG. 16, adjacent the lower left and right hand sides of the mating face of the female connector are undercut notches which are adapted to receive lateral locking flange members projecting from opposed sides of the mating face of the male connector. These notches further serve to polarize the mating of the male plug within the female connector and further assist in guiding the male connector into fully mated position within the female connector.

Figure 22:
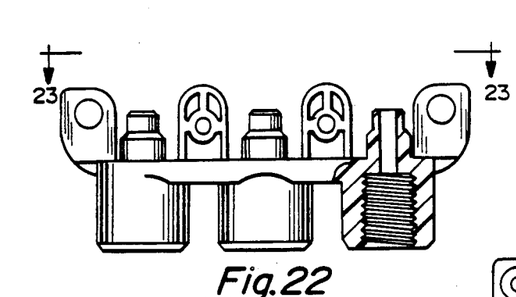
FIG. 22 is a top plan view, partly in section, showing the male connector half of the I/O connector of this invention.
Figure 23:
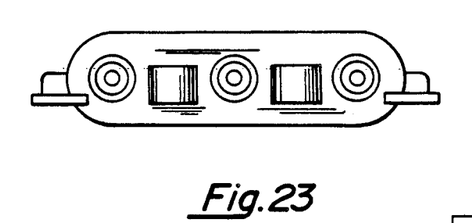
FIG. 23 is a front elevational view of the mating face of the male connector half.
Figure 24:
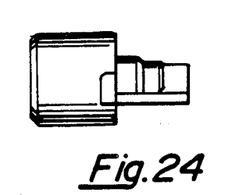
FIG. 24 is an elevated cross sectional view of the male connector half, taken along view lines 24—24 in FIG. 23.

Referring now to FIGS. 22 through 24, the complimentary mating male connector is shown. It includes a forward mating face including three spaced apart fluid conveying projections having a stepped configuration with an angled transition portion terminating in a forward cylindrical portion. Three O-ring seals are positioned on the cylindrical portion to provide sealing locked engagement between the fluid conveying projections on the male member within the socket formations of the female compliment.

Projecting from the mating face of the male connector intermediate the fluid conveying projections are a pair of bullet nosed mating guide projections which are adapted to be received through the rectangular openings in the mating face of the female connector, guide the fluid carrying projections into proper position for mating with the female socket portions. A pin receiving opening is defined in each of the guiding projections intermediate its length which is adapted to cooperatively receive the locking pins from the mounting flange member or bracket member. Projecting laterally on opposed sides of the mating face of the male connector are screw receiving locking flange members adapted to be sandwiched between side flanges on a locking bracket and threaded apertures adapted to receive screws on the female connector. Projecting rearwardly from the male connector housing opposite its mating face are three tube coupling shroud formations for connection to system tubing lines to the storage tank, to the system drain, and to the incoming source of impure tap water at line pressure.

Figure 21:
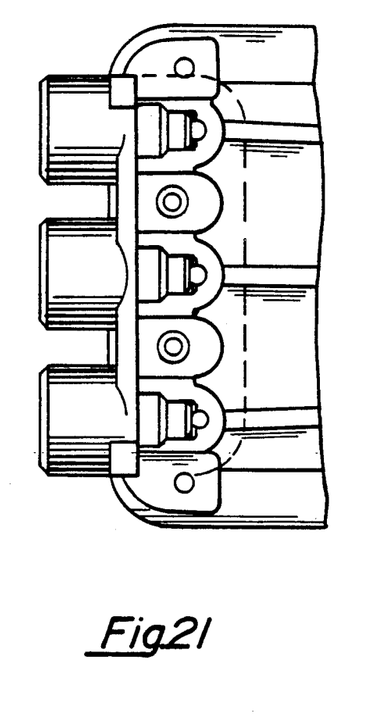
FIG. 21 is a top plan view of the male and female I/O connector halves shown in mated, sealingly engaged relationship.

Referring now to FIG. 21, the input/output connector is shown in its mated and locked and sealed position with the locking bracket member in place. Each of the O-ring seals carried on the mating face of the male member are compressed between the angled surfaces of the male member and the socket member to provide a fluid tight seal for the fluid conducting projections. Each of the guiding projections have been received within the guiding apertures defined in the mating face until the openings in the guiding projections are disposed in registration with the pin receiving openings of the female connector. This ensures that the male connector has been urged forwardly into a mated and sealed engagement within the female connector. The mounting bracket may be affixed into position by passing threaded screws through the lateral mounting flange portions of the male connector to secure it in locked and mated condition to the female connector as shown.

Figure 19:
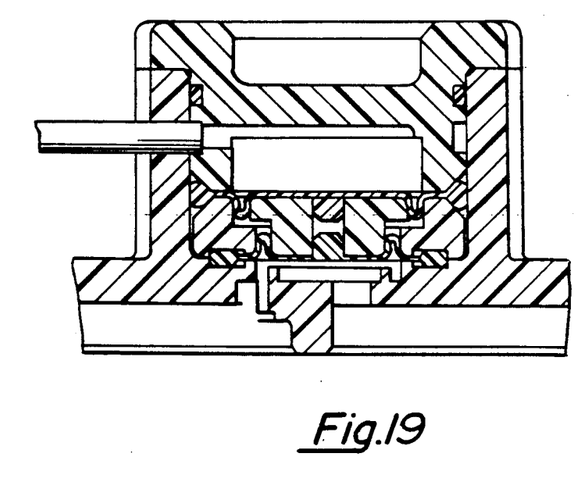
FIG. 19 is an elevated cross sectional view of the automatic shutoff valve for use with the fluid flow control device of this invention.

Referring now to FIG. 19, the automatic shutoff housing molded into the upper surface of the upper body half is adapted to receive automatic shutoff valving elements as shown. The valving elements include a positioning ring, a movable piston secured between upper and lower diaphragm members, and sealingly engaged to the valve housing structure by a valve cap structure. In assembled condition as shown in FIG. 19 a lower valve chamber is defined adjacent the valve seat and an upper valve chamber is defined within the secured cap member. The area of the upper piston surface is considerably larger than the area of the lower piston surface. In accordance with this arrangement, incoming tap water at line pressure passes upwardly through the valve from the sediment filter into the lower valve chamber, thereby exerting a pressure on the movable piston. This causes it to lift off the valve seat permitting the pre-filter water to flow into the valve outlet for transmission to the granulated activated carbon inlet passageways. The upper valve chamber is connected to the pure water R.O. outlet communicating with the pure water side of the storage tank.

As purified R.O. water fills the storage tank to capacity a back pressure in the pure water line will cause back pressure in the upper valving chamber. Pressure in the upper valving chamber will cause movement of the piston downwardly against the valve seat to shutoff incoming water flow when the tank is substantially filled. By adjusting the relative area of the upper piston surface to the lower piston surface the valve can be adjusted to shutoff incoming water flow when a relatively moderate amount of pressure increase is experienced in the storage tank pure water line. For example, it may be actuated to its closed or shutoff position at approximately ½ line pressure or less.

Figure 20:
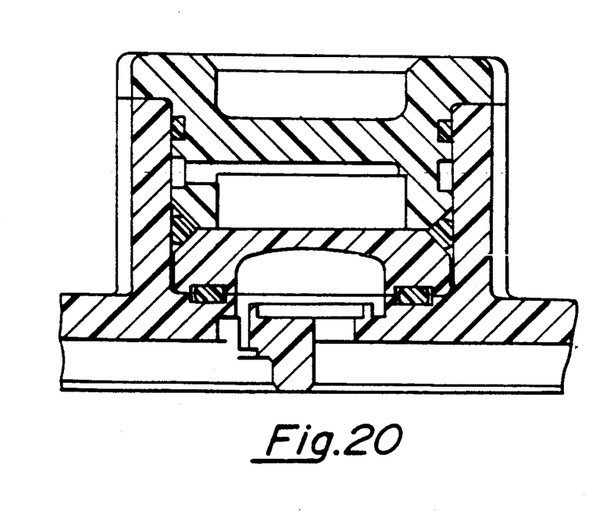
FIG. 20 is an elevated cross sectional view of the automatic shutoff housing which has been converted so that no automatic shutoff function is provided.

Referring now to FIG. 20, in some embodiments the filter section in accordance with the present invention may not require there to be an automatic shutoff valve provided. In accordance with these arrangements, the shutoff valve housing may be effectively closed off by means of a conversion plug member which cooperates with the valve housing cap to permit incoming fluid to flow through the lower valve chamber and out through the exit without any other valve activity.

In accordance with the present invention the new and improved fluid flow control device may be made by hot plate fusion bonding of a pair of individually molded housing halves. The hot plate fusion bonding methods are known in the art. The hot plate melt fusion bonding procedure basically involves contacting the mating faces to be joined with a heated plate to plasticize the thermoplastic edges. A molten plastic bead is formed by applying pressure against the molded parts against the plate. The depth of molten material can be determined by the tooling and the pressure regulating system. The parts are quickly separated and the heating plate is removed. Thereafter, fixtures holding the parts are moved together to contact the molten plastic surfaces together under pressure. Each of the contact lines of the upper and lower parts fuse together as the plastic cools.

The hot plate fusion bonding method provides parts which after fusion bonding can withstand very high internal pressures within the channels and passageways defined therein of up to 1100 psi. Air gaps and flashes and incomplete bonding are easily eliminated by controlling the depth of molten plastic bead that is formed and by providing the flash tracks or moat areas in between the channel members. In accordance with the present invention, each of the housing halves for forming the fluid flow control device is preferably molded of a thermoplastic material and especially preferably will be molded from a alloyed thermoplastic composition comprising ABS and nylon.

The temperatures to which the heat plate must be heated to provide hot plate fusion bonding may vary depending on the thermoplastic material selected. Generally, temperatures on the order of 375° to 520° F. are suitable.

The ability to hot plate fusion bond thermoplastics enables the fluid flow control device to be molded from independent complimentary housing halves. This provides improved flexibility in channel and passageway design by injection molding the housing parts than is provided by trying to core out or machine similar passageways in a solid molded block of thermoplastic resin. Moreover, the ability to mold the housing parts enables the various other structures to be incorporated into the mold such as the valve housing and the tube connector for the R.O. leads. These additional features may be molded in without having to provide separate leakable structures for connecting them to the housing of the fluid flow control device.

In accordance with this invention, the fluid flow control device permits the filter section of an R.O. system to have pop-in/pop-out easy access feature.

Although the present invention has been described with reference to a filter section including a sediment pre-filter, a granulated activated carbon pre-filter and a reverse osmosis membrane filter, other filter cartridges could be affixed to the fluid flow control device by means of a socketing portions as desired. The passages have been specially designed with the molds for the housing halves to provide for a variety of programmable flow possibilities. As indicated in the drawings quick change tooling in the mold can convert the mold from one arrangement to another. Only one basic mold is therefore needed to produce a variety of fluid flow control devices for use with a number of filter module arrangements.

The fluid flow control device dramatically cuts down on the number of potential leakage problems caused by connections of polytubing. More particularly a comparison of the FIG. 2 assembly with the assembly shown in FIG. 3 indicates that the prior art system included 16 separate polytube connectors susceptible of leaking in the pressure environment, whereas the FIG. 3 device, in accordance with the present invention, has a total number of five possible leaking connections to tubing.

Although the present invention has been described with reference to preferred embodiment modifications or changes may be made therein by those skilled in this art. For example other filters and filter modules may be employed in substitution for those disclosed, for example, ceramic filters or other filters may be used. Moreover, instead of providing three socket formations adapted to matingly and sealingly receive filter modules, any number of filter modules may be connected to an extended length fluid flow control device molded and prepared in accordance with the teachings provided herein. All such obvious modifications or changes may be made herein by those skilled in this art without departing from the scope and spirit of this invention as defined by the appended claims.

We claim:

1. A water filtration purification apparatus for use in a reverse osmosis (R.O.) system, said R.O. system including:
   a source of impure tap water at line pressure; means for dispensing purified water from a storage tank to a point of use; means for introducing purified water into the storage tank; and means for conveying waste water to drain;
   said water filtration purification apparatus comprising:
   a fluid flow control device including an elongate unitary thermoplastic body having a generally rectangular configuration defined between spaced and opposed upper and lower major surfaces, a plurality of filter module-receiving socket formations extending normally from said lower surface at spaced apart locations along the length thereof, each socket formation including coaxially aligned radially inner and radially outer spaced apart tubular projections, an inner recess defined within said inner tubular projection and an outer annular recess defined between said inner and outer tubular projections, an aperture defined in said lower surface disposed with each said inner and outer recess; a plurality of discrete fluid flow passages defined in said body connecting certain ones of said socket apertures, female input/output connector means disposed at one end of said body, said female connector including a plurality of channel means for connecting selected ones of said passages to said system tap water source, said introducing means and said conveying means, respectively, said female connector means being adapted to polarizedly matingly sealingly and lockingly engage a complimentary male I/O connector; and a like plurality of filter modules matingly and sealingly engaged in said socket formations;
   and means designed for communicating with said R.O. system.

* * * * *